United States Patent [19]
Saitoh

[11] Patent Number: 4,912,564
[45] Date of Patent: Mar. 27, 1990

[54] CLOCK SIGNAL GENERATION APPARATUS
[75] Inventor: Shouji Saitoh, Takahagi, Japan
[73] Assignee: Hitachi, Ltd., Tokyo, Japan
[21] Appl. No.: 315,303
[22] Filed: Feb. 24, 1989
[30] Foreign Application Priority Data
  Feb. 26, 1988 [JP] Japan .................................. 63-42044
[51] Int. Cl.⁴ ............................................ H04M 1/36
[52] U.S. Cl. .................................... 358/409; 328/55; 328/63
[58] Field of Search ................ 358/409, 410, 296, 480, 358/481; 346/103

[56] References Cited
U.S. PATENT DOCUMENTS
  4,796,098 1/1989 Shimada .............................. 358/409

FOREIGN PATENT DOCUMENTS
  126378 3/1981 Japan .
  58-25766 2/1983 Japan .................................. 358/409
  104568 6/1983 Japan .

Primary Examiner—Edward L. Coles, Sr.
Attorney, Agent, or Firm—Antonelli, Terry & Wands

[57] ABSTRACT

A clock signal generation apparatus is disclosed in which an original signal source generates an original clock signal, a first frequency divider starts dividing the frequency of the original clock signal in response to the rise of the original clock signal and produces a frequency-divided clock signal, a second frequency divider starts dividing the frequency of the original clock signal in response to the fall of the original clock signal and produces a frequency-divided clock signal, a sync timing signal source generates a sync timing signal, and a selection circuit renders effective selected one of the first and second frequency dividers in accordance with a level of the original clock signal at selected one of the ride and fall timings of the sync timing signal thereby to produce the frequency-divided clock signal of the effective frequency divider as a clock signal.

9 Claims, 4 Drawing Sheets

HORIZONTAL SCANNING DIRECTION

HORIZONTAL SCANNING

HORIZONTAL SCANNING (a) BDT SIGNAL
(b) ORIGINAL CLOCK fc
(c) fc/2
(d) fc/4
(e) VIDEO CLOCK fc/8
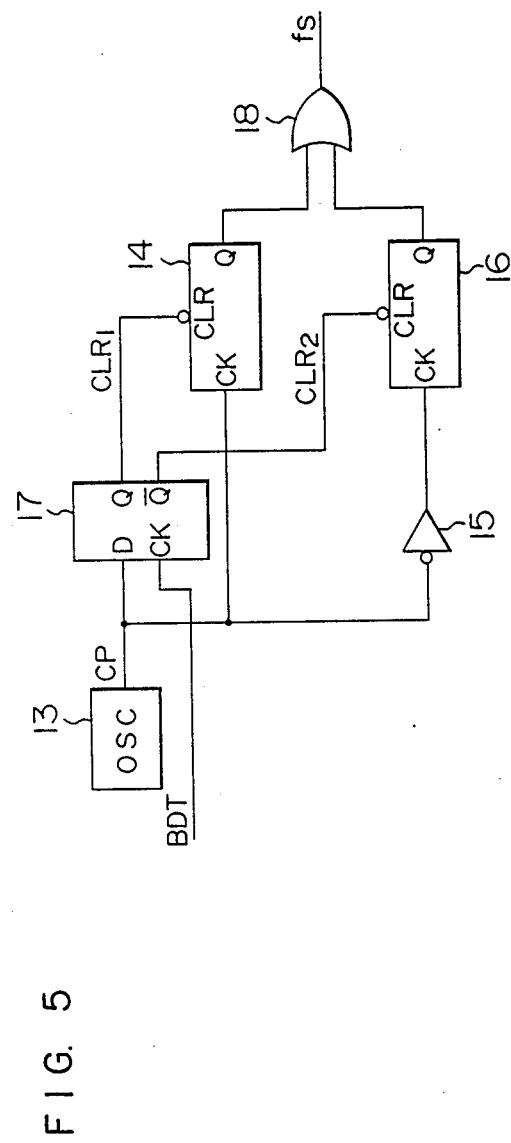
F I G. 5

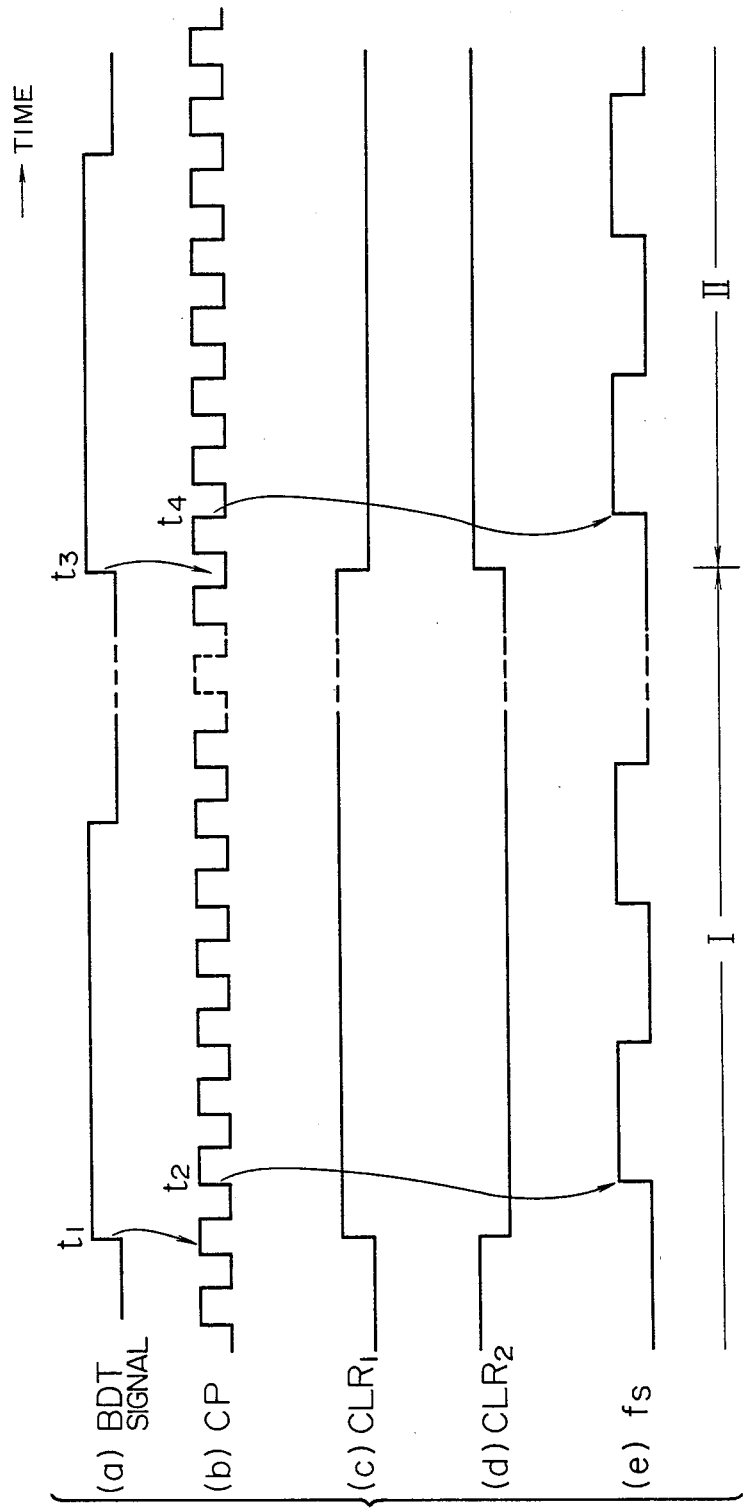

CLOCK SIGNAL GENERATION APPARATUS

BACKGROUND OF THE INVENTION

The present invention relates to a clock signal generation apparatus, and more in particular to a clock signal generation apparatus suitable for generating a video signal accurately corresponding to the scanning start position of a scanning beam for a laser beam printer.

In a laser beam printer, as shown in FIG. 1, a video amplifier 1 amplifies a video signal produced from a video signal generation circuit 11 thereby to drive a laser diode 2. The laser light produced from the laser diode 2 is shaped by a coupling lens 3 into a laser beam, deflected by a polygon mirror 5 rotated at high speed by a scanner motor 4, and scans and exposes the surface of a light-sensitive drum 7 through an F-$\theta$ lens 6. The light-sensitive drum 7, which is rotating at a fixed speed, forms a toner image on the recording paper by a series of xerographic process including charging, exposure by scanning, development and transfer. The toner image on the recording paper is fixed and used.

In this laser beam printer, in order to synchronize the timing of starting the exposure by scanning with the timing of generating the video signal, the timing of the laser beam passing the scanning start reference position is detected by a photo sensor 8 making up a scanning beam detector, and an output signal of the photo sensor 8 is amplified by a sensor amplifier 9 thereby to produce a sync timing signal, that is, a beam detecting (BDT) signal. A scanning phase sync circuit 10 making up a clock signal generation unit generates a video clock signal synchronous with the sync timing signal, and an image shown in FIG. 2 or FIG. 3A is recorded on the basis of the video clock signal. In view of the fact that this video clock signal is formed by utilizing an original clock signal produced from a fixed frequency oscillation circuit, however, it is difficult to match the phase of the sync timing signal with that of the original clock signal at each starting time point of horizontal scanning, thus causing an out-of-phase condition (phase difference) within a range of one cycle of clock signal between the two signals.

Specifically, in a conventional clock signal generation apparatus disclosed in JP-A-56-126378 as shown in FIG. 3, for example, the timing of frequency division of the original clock signal is controlled in response to a sync timing signal. In other words, in response to, say, the rise of an original clock signal immediately after generation of a sync timing signal (BDT signal), the frequency division of the original clock signal is started thereby to produce a video clock. Regardless of whether the BDT signal is generated at a time point $t_1$ indicated by solid line or at a time point $t_2$ indicated by dotted line, therefore, the original clock signal starts being frequency-divided from a time point $t_3$, so that there occurs a phase difference of one cycle of the clock signal at maximum between the sync timing signal and the video clock signal.

This phase difference is presented, as shown in FIG. 3B, as a displacement $\Delta d$ of recording pixels along the horizontal scanning direction between horizontal scanning lines of the laser beam. In the case shown in FIG. 4, for example, if a clock signal whose frequency is divided to one eighth of a clock frequency $f_c$ is used as a video clock signal, the maximum phase difference becomes one eighth of the period of the video clock. In other words, the displacement $\Delta d$ of recording pixels is one-eighth of one dot at maximum, where one dot equals to the width of one pixel.

Generally, in order to perform the recording of pixels with a high-definition, the displacement of the recording pixels $\Delta d$ is preferably less than about one eighth of a dot. In order to record a high-definition image, therefore, if the frequency of a video clock signal ($f_c/8$) is 20 MHz, the clock frequency $f_c$ is required to be 160 MHz. If the frequency of the video clock signal is increased to 30 MHz for increasing the scanning rate, on the other hand, the frequency of the original clock signal would become 240 MHz. A circuit for generating an original clock signal of such a high frequency and a frequency-dividing circuit are high in cost. Therefore, a clock signal generation apparatus for generating a high-frequency video clock has been expensive.

In the prior art, as disclosed in JP-A-58-126398 and JP-A-58-104565, an original clock signal is delayed by a delay circuit to produce a plurality of clock signals whose phase differences are different to one another, so that one of the plurality of clock signals with an optimum frequency is selected in response to a sync timing signal, and the selected clock signal is frequency-divided thereby to produce a video clock. This circuit comprising the delay circuit made up of an analog signal processing circuit, however, has posed the problem of a low stability since the delay time of the delay circuit fluctuates with temperature changes.

Further, if the frequency of the original clock signal changes, the delay time of respective delay elements of the delay circuit are required to be changed accordingly, thus necessitating a change of the delay circuit to another one.

SUMMARY OF THE INVENTION

An object of the present invention is to obviate the above-mentioned disadvantages of the conventional clock signal generation apparatuses and to provide a novel clock signal generation apparatus which is low in cost and capable of generating a clock signal stably with high accuracy.

According to one aspect of the present invention, there is provided a clock signal generation apparatus comprising, in order to achieve the above-mentioned object, an original clock signal frequency-dividing circuit including first and second frequency-dividing circuits which start frequency-dividing the original clock signal in response to the leading edge and the trailing edge of the original clock signal respectively, and a selection circuit for rendering effective one of the first and second frequency-dividing circuits selectively in accordance with level of the original clock signal at the timing of one of the leading edge and the trailing edge of a sync timing signal.

The selection circuit is preferably a flip-flop which samples the signal level of the original clock signal at timings of generation of the sync timing signal and changes its output state in accordance with the sampled level, so that one of the frequency-dividing circuits is rendered effective in accordance with the output state of the flip-flop. If the sync timing signal for the clock signal generation apparatus is obtained from a scanning beam detection circuit, the frequency divided clock signals produced from the frequency-dividing circuits are suitably used as a video clock signal.

In a clock signal generation apparatus configured as explained above, the first and second frequency-dividing circuits produce a frequency-divided clock signal by frequency-dividing the original clock signal respectively, and therefore phase adjustment is made possible with the number of stages (phase of original clock signal generation) corresponding to the frequency-dividing rate.

Further, in view of the fact that the frequency-divided clock signals produced from the first and second frequency-dividing circuits have a phase difference therebetween equivalent to one-half cycle of the original clock signal. By selecting one of the two frequency-divided clock signals, therefore, phase adjustment is assured in stages twice as many as the frequency-dividing rate (phase difference equivalent to one-half cycle of the original clock signal). This indicates that if the frequency of the frequency-divided clock signal and the accuracy of phase adjustment are equal to those of the conventional apparatuses, a frequency of the original clock signal one-half of that for the conventional apparatus is sufficient. As a result, a clock signal with high accuracy can be produced by use of a low-cost processing circuit including an oscillation circuit and a frequency-dividing circuit of comparatively low frequency characteristics.

The flip-flop circuit effectively holds the previously selected state until the next sync timing signal is generated. If the frequency-divided clock signal is used as a video clock signal, a high-definition image recording becomes possible with only a small displacement of recording pixels.

Furthermore, for lack of a delay member such as a delay line, the apparatus according to the invention remains stable against temperature changes, and the frequency divider, selection circuit, etc. need not be changed with the frequency of the original clock signal.

BRIEF DESCRIPTION OF THE DRAWINGS

FIG. 5 is a circuit diagram of a typical clock signal generation apparatus according to the present invention.

FIG. 6 is a timing chart for explaining the operation of the apparatus shown in FIG. 5.

DESCRIPTION OF THE PREFERRED EMBODIMENT

Figure 1:
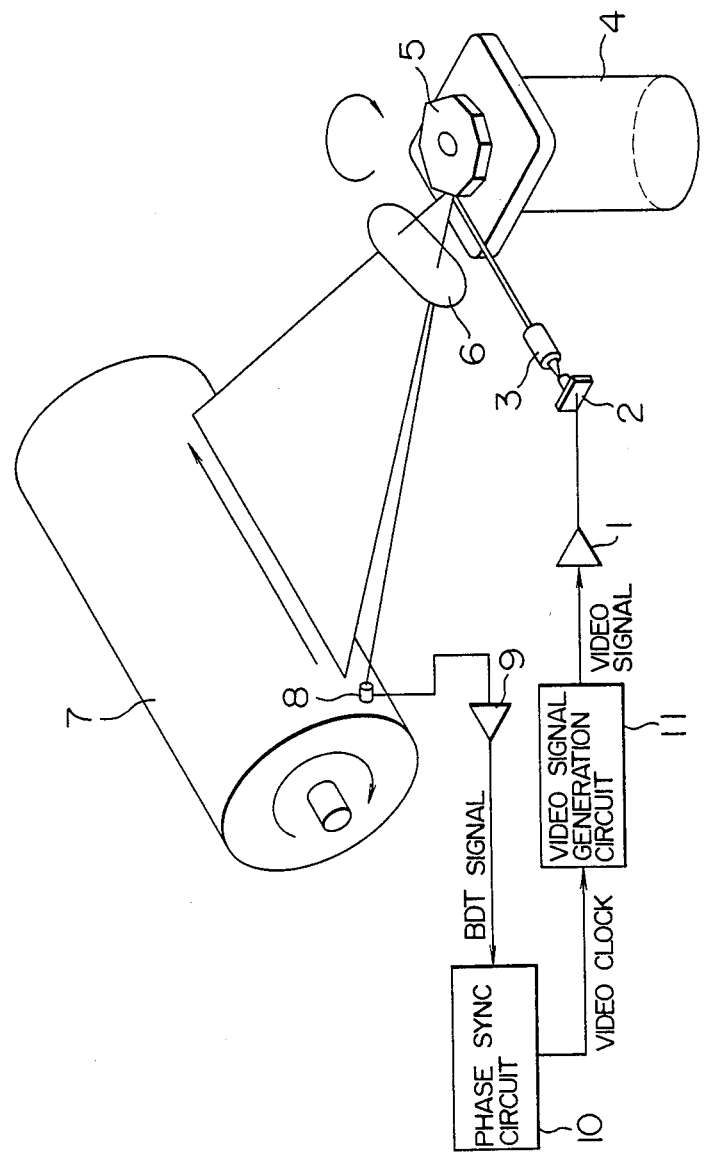
FIG. 1 is a diagram showing a configuration of a laser beam printer to which the present invention is applied.
Figure 2:
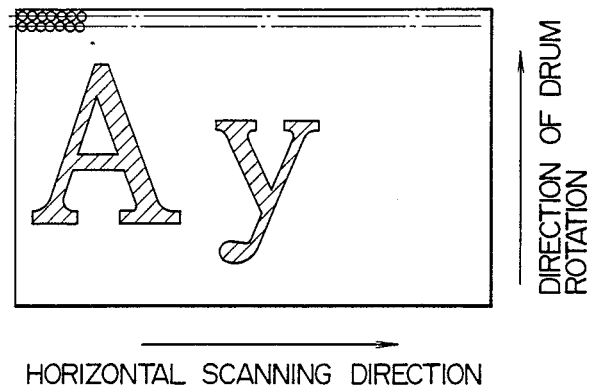
FIGS. 2 and 3A, 3B show examples of record images produced on the laser beam printer.
Figure 3A:
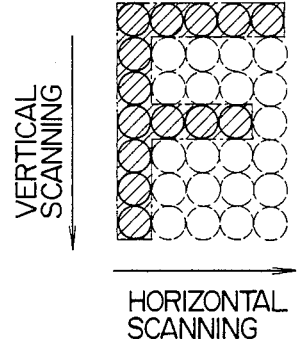
Figure 3B:
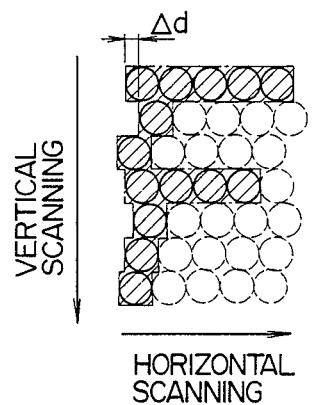
Figure 4:
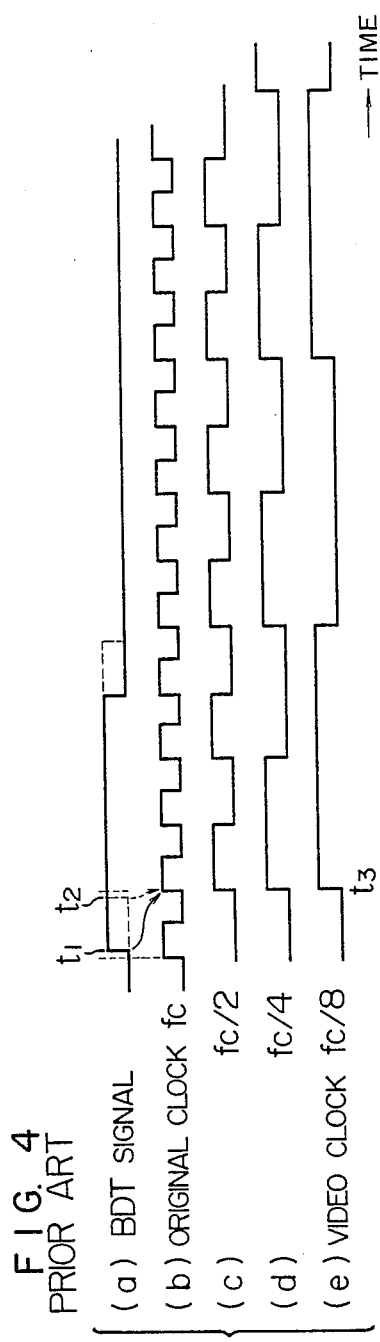
FIG. 4 is a timing chart for explaining the operation of a conventional clock signal generation apparatus.

A preferred embodiment of a clock signal generation apparatus according to the present invention will be described in detail below with reference to the accompanying drawings.

FIG. 5 is a circuit diagram of a typical embodiment of a clock signal generation apparatus according to the present invention, and FIG. 6 shows waveforms of signals produced at various parts of the apparatus of FIG. 5.

In FIG. 5, an original clock signal generation circuit 13 is for producing an original clock signal CP of a frequency which is an integral multiple of the frequency of a frequency-divided clock signal required (e.g., 80 MHz). A frequency divider 14 making up a first frequency-dividing circuit is supplied at a clock input terminal CK thereof with the original clock signal in its direct form. A second frequency-dividing circuit includes an inverter 15 and a frequency divider 16. The clock input terminal CK of the frequency divider 16 is supplied with the original clock signal CP with the signal level thereof inverted by the inverter 15. The two frequency-dividers 14 and 16 are configured in such a manner as to divide the frequency (80 MHz) of the original clock signal CP into, say, one-fourth in response to the rise of a clock signal when clear signals applied to respective clear signal input terminals CLR are "high".

A flip-flop circuit, or preferably a D-type flip-flop circuit 17 making up a selection circuit is configured in such a manner that the signal level applied to the data input terminal D is sampled and produced at an output terminal Q at the leading edge of a sync timing signal BDT applied to the clock signal input terminal CK, and an inverted level thereof is produced at an output terminal $\overline{Q}$. The output terminal Q is connected to a clear signal input terminal CLR of the first frequency divider 14, and the output terminal $\overline{Q}$ to a clear signal input terminal CLR of the second frequency divider 16, thereby producing clear signals $CLR_1$ and $CLR_2$ respectively.

Frequency divided output signals produced from the output terminals Q of the two frequency dividers 14 and 16 are applied through a logic circuit (OR gate) 8 and produced as a frequency-divided clock signal $f_s$ (20 MHz).

According to the clock signal generation apparatus configured as described above, as shown in FIG. 6, if the sync timing signal BDT rises when the original clock signal CP is "high" at time point $t_1$, the output signal (clear signal $CLR_1$) at the output terminal Q of the flip-flop circuit 17 becomes "high", while the output signal (clear signal $CLR_2$) at the output terminal $\overline{Q}$ becomes "low" level. This state is held until the arrival of the next sync timing signal BDT.

As a result, the flip-flop circuit 17 selects and make effective the first frequency divider 14 for frequency-dividing the original clock signal CP in response to the rise of the signal CP at a time point $t_2$ immediately following the time point $t_1$, so that the frequency-divided output thereof is produced as a frequency-divided clock signal $f_s$ through an OR circuit 18. In this way, as long as the original clock signal CP remains "high" at the rise of the BDT signal, the Q output of the flip-flop circuit 17 is also kept "high", so that the frequency divider 14 is kept selected as shown by a region I in FIG. 6.

If the sync timing signal BDT rises (at time point $t_3$) when the original clock signal CP is at low level, on the other hand, the flip-flop circuit 17 changes its output state in a manner that the output signal at the output terminal Q thereof (clear signal $CLR_1$) becomes "low" level and the output signal at the output terminal $\overline{Q}$ thereof ($CLR_2$) becomes "high" level.

The second frequency divider 16 is thus selected and rendered effective thereby to frequency-divide the original clock signal CP in response to the fall thereof (at time point $t_4$) immediately after the time point $t_3$. The output thus frequency-divided is applied through the OR circuit 18 as a frequency-divided clock signal $f_s$. In this way, as long as the original clock signal CP remains at "high" level at the time of rise of the BDT signal, the $\overline{Q}$ output of the flip-flop circuit 17 is held at "high" level and the frequency divider 16 is kept selected as shown by a region II.

Instead of determining the output state of the flip-flop circuit 17 in accordance with the level of the original clock signal CP at the time of fall of the sync timing signal BDT as in the aforementioned embodiment, the same output state may be determined in accordance with the level of the original clock signal CP at the time of fall of the BDT signal with equal effect. In such a case, the sync timing signal BDT may be applied through an inverter to the clock input CK of the flip-flop circuit 17.

Also, the input terminals CLR of the frequency dividers 14 and 16 may supplied with the clear signals $CLR_2$ and $CLR_1$ respectively, that is, reversely from the embodiment described above with equal effect.

As explained above, the apparatus according to the present invention comprises a first frequency-dividing circuit responsive to the leading edge of an original clock signal and a second frequency-dividing circuit energized in response to the trailing edge of the original clock signal in order to divide the frequency of the original clock signal, wherein one of the two frequency-dividing circuits is rendered selectively effective to produce a frequency-divided signal in accordance with the signal level of the original clock signal at the time of one of rise and fall of a sync timing signal.

The frequency-divided clock signals produced from the first and second frequency-dividing circuits have a phase difference therebetween equivalent to one half of a cycle of the original clock signal, and therefore, by selecting one of the two frequency-divided signals, phase adjustment is made possible in stages twice as many as the frequency-dividing rate (a phase difference equivalent to one half of a cycle of the original clock signal). This indicates that if the frequency of the frequency-divided clock signals (say, 20 MHz) and the phase-adjustment accuracy of the system according to the present invention are assumed to be equal to those of a conventional system, the frequency of the original clock signal is allowed to be one-half of that for the conventional systems. As a result, in the case where the frequency of the frequency-divided clock signals is one fourth that of the original clock signal, in order to make the maximum phase difference between the sync timing signal and the video clock signal to be one eighth of the video clock period, the frequency of the original clock signal according to the present invention is sufficient at 80 MHz that is one-half of the frequency for the conventional apparatus.

As a consequence, a frequency-divided clock signal of a high accuracy is produced from an original clock signal of a comparatively low frequency, thereby reducing the cost of the circuit configuration.

In using this clock signal generation apparatus as the scanning phase sync circuit 10 for generating a video clock signal in the laser beam printer shown in FIG. 1, a scanning timing signal BDT is obtained from a scanning beam detection circuit (that is, the photo sensor 8 and the sensor amplifier 9) by detecting the timing of a laser beam passing a scanning reference point such as a scanning start reference point, and a frequency-divided clock signal $f_s$ is produced as a video clock signal. By so doing, the phase of the video clock signal follows the scanning sync timing signal with high accuracy, thus assuring a high-definition image recording.

The flip-flop circuit as a selection circuit for making the two frequency-dividing circuits selectively effective is suitable for using so as to hold a selected state due to the previous sync timing signal before arrival of the next sync timing signals. Further, the clock signal generation apparatus according to the present invention is suited for generating a video clock signal to record a high-definition image on the laser beam printer.

We claim:

1. A clock signal generation apparatus comprising:
   means for generating an original clock signal;
   first frequency-dividing means for starting the frequency division of said original clock signal in response to the rise of said original clock signal and producing a frequency-divided clock signal;
   second frequency-dividing means for starting the frequency division of said original clock signal in response to the fall of said original clock signal and producing a frequency-divided clock signal;
   means for generating a sync timing signal; and
   selection means for rendering one of said first and second frequency-dividing means effective selectively in accordance with a signal level of said original clock signal at selected one of the rise timing and fall timing of said sync timing signal, thereby producing a frequency-divided clock signal from the selected one of said first and second frequency-dividing means.

2. A clock signal generation apparatus according to claim 1, wherein said selection means is a flip-flop circuit which holds one of said first and second frequency-dividing means effective selectively in accordance with the signal level of the original clock signal at the selected one of the rise and fall timings of said sync timing signal as long as said signal level at the selected one of the rise and fall timings of said sync timing signal remains the same.

3. A clock signal generation apparatus according to claim 2, wherein said flip-flop circuit is a D-type flip-flop circuit including a data input terminal supplied with said original clock signal and clock signal input terminal supplied with said sync timing signal.

4. A clock signal generation apparatus according to claim 1, wherein said first frequency-dividing means includes a first frequency divider, and said second frequency-dividing means includes an inverter connected to the output of said original clock signal generation means and a second frequency divider connected to the output of said inverter and having the same frequency-dividing rate as said first frequency divider.

5. A clock signal generation apparatus comprising:
   means for generating an original clock signal;
   first frequency-dividing means for starting the frequency division of said original clock signal in response to the rise of said original clock signal and producing a frequency-divided signal as a video clock signal;
   second frequency-dividing means for starting the frequency division of said original clock signal in response to the fall of said original clock signal and producing a frequency-divided signal as a video clock signal;
   means for generating a scanning sync timing signal; and
   selection means for rendering one of said first and second frequency-dividing means effective selectively in accordance with a signal level of said original clock signal at selected one of the rise timing and the fall timing of said sync timing signal, thereby producing an output signal of said selected frequency-divided signal as a video clock signal.

6. A clock signal generation apparatus according to claim 5, wherein said scanning sync timing signal generation means includes a scanning beam detection circuit for detecting the passage of a scanning beam at a scanning start reference point to thereby produce said scanning sync timing signal.

7. A clock signal generation apparatus according to claim 5, wherein said selection means is a flip-flop circuit which holds one of said first and second frequency-dividing means selectively effective in accordance with the signal level of said original clock signal at selected one of the rise timing and the fall timing of said sync timing signal as long as said signal level at the selected one of the rise and fall timings of said sync timing signal remains the same.

8. A clock signal generation apparatus according to claim 7, wherein said flip-flop circuit is a D-type flip-flop including a data input terminal supplied with said original clock signal and a clock signal input terminal supplied with said sync timing signal.

9. A clock signal generation apparatus according to claim 5, wherein said first frequency-dividing means includes a first frequency divider, and said second frequency-dividing means includes an inverter connected to the output of said original clock signal generation means and a second frequency divider connected to the output of said inverter and having the same frequency-dividing rate as said first frequency divider.

* * * * *